(12) United States Patent
Kim

(10) Patent No.: US 9,507,128 B2
(45) Date of Patent: Nov. 29, 2016

(54) LENS ASSEMBLY AND CAMERA MODULE INCLUDING THE SAME

(71) Applicant: Samsung Electro-Mechanics Co., Ltd., Suwon-si (KR)

(72) Inventor: Duck Hun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/943,574

(22) Filed: Nov. 17, 2015

(65) Prior Publication Data

US 2016/0178874 A1   Jun. 23, 2016

(30) Foreign Application Priority Data

Dec. 23, 2014   (KR) .......................... 10-2014-0187401

(51) Int. Cl.
| | | |
|---|---|---|
| G02B 7/02 | (2006.01) | |
| G02B 13/00 | (2006.01) | |
| G02B 13/16 | (2006.01) | |
| G02B 5/00 | (2006.01) | |

(52) U.S. Cl.
CPC ........... *G02B 13/0055* (2013.01); *G02B 5/005* (2013.01); *G02B 7/021* (2013.01); *G02B 13/004* (2013.01); *G02B 13/0045* (2013.01); *G02B 13/16* (2013.01); *G02B 7/022* (2013.01)

(58) Field of Classification Search
CPC .. G02B 13/0055; G02B 7/003; G02B 7/021; G02B 7/022
See application file for complete search history.

(56) References Cited

U.S. PATENT DOCUMENTS

| | | | |
|---|---|---|---|
| 2006/0222300 A1* | 10/2006 | Frenzel | G02B 7/021 385/88 |
| 2009/0047011 A1* | 2/2009 | Okamoto | G02B 7/021 396/529 |
| 2014/0254034 A1 | 9/2014 | Lyu | |
| 2015/0022896 A1* | 1/2015 | Cho | G02B 13/0035 359/601 |
| 2015/0116849 A1* | 4/2015 | Hou | G02B 13/004 359/754 |
| 2015/0241656 A1* | 8/2015 | Choi | G02B 7/021 359/738 |
| 2015/0293330 A1* | 10/2015 | Gutierrez | G02B 13/0015 359/811 |
| 2015/0331219 A1* | 11/2015 | Chen | G02B 7/021 359/771 |

FOREIGN PATENT DOCUMENTS

| | | |
|---|---|---|
| JP | 2014-164239 A | 9/2014 |
| KR | 10-2008-0037782 A | 5/2008 |
| KR | 10-2014-0109757 A | 9/2014 |

* cited by examiner

*Primary Examiner* — William Perkey
(74) *Attorney, Agent, or Firm* — NSIP Law

(57) ABSTRACT

A lens assembly includes lenses and a lens barrel accommodating lenses. At least one of the lenses is a non-contact lens coupled to the lens barrel, in non-contact with the lens barrel.

16 Claims, 4 Drawing Sheets

LENS ASSEMBLY AND CAMERA MODULE INCLUDING THE SAME

CROSS-REFERENCE TO RELATED APPLICATION

This application claims the priority and benefit under 35 USC 119(a) of Korean Patent Application No. 10-2014-0187401 filed on Dec. 23, 2014, with the Korean Intellectual Property Office, the disclosure of which is incorporated herein by reference.

BACKGROUND

1. Field

The following description relates to a lens assembly in which a lens and a lens barrel are easily coupled, and a camera module including the same.

2. Description of Related Art

Camera modules used in portable terminals or digital cameras need to be manufactured with precision and accuracy to secure an intended degree of resolution.

As sizes of cameras are reduced in size and pixel integration increases in solid state imaging devices used in the cameras, it is increasingly important to improve the performance of lens assemblies and the management of precision. Thus, smaller, lighter camera modules are required.

A lens assembly provided in camera modules is manufactured by inserting a plurality of unit lenses into a lens barrel. An alignment or optical axes of the unit lenses is determined by concentricity and precision in the formation of the lens barrel.

However, it is difficult to precisely manage concentricity and flatness of the lens barrel. Further, a high possibility that optical axes of lenses, generally within 10 μm, may not be identical, for instance, a problem of a decentering error may occur.

Such a decentering problem degrades the performance and resolution of cameras. A problem due to decentering is aggravated as the amounts of pixels of cameras increase and sizes of lens assemblies are reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a lens assembly, including: lenses; and a lens barrel accommodating lenses, wherein at least one of the lenses is a non-contact lens coupled to the lens barrel, in non-contact with the lens barrel.

The lenses may include a forward lens disposed in a forward position from an object side, and a rear lens disposed in a rear position from an image formation side, wherein the non-contact lens is disposed between the forward lens and the rear lens.

The forward lens may include a first protrusion portion protruding from a rib of the forward lens toward the rear lens.

An end of the first protrusion portion may be in contact with a rib of the rear lens.

The non-contact lens may be accommodated in an internal space formed between the rib of the forward lens and the first protrusion portion.

A light blocking member may be interposed between a rib of the non-contact lens and the rib of the forward lens.

The first protrusion portion may protrude to have an annular shape along the rib of the forward lens.

The non-contact lens may be coupled to the forward lens such that an outer circumferential surface of the non-contact lens is in contact with an inner circumferential surface of the first protrusion portion.

The first protrusion portion may be formed to have a cross-sectional area decreasing toward an end of the first protrusion portion.

The first protrusion portion may have an inner circumferential surface formed as a sloped surface.

An inner diameter of the first protrusion portion may be equal to an outer diameter of the non-contact lens or is greater within tolerance.

At least one of inner circumferential surfaces of the forward lens may face at least one of outer circumferential surfaces of the non-contact lens, including a light blocking member.

The rear lens may have a second protrusion portion protruding from a rib of the rear lens toward the forward lens.

The second protrusion portion may be engagingly coupled to the first protrusion portion.

The rear lens may be coupled to the forward lens such that the first protrusion portion is accommodated in a space formed within the second protrusion portion.

A central axis alignment of the non-contact lens may be determined by the first protrusion portion of the forward lens.

In accordance with an embodiment, there is provided a camera module, including: a lens assembly including a lens barrel accommodating lenses, at least one of the lenses is a non-contact lens coupled to the lens barrel, in non-contact with the lens barrel; and a housing coupled to the lens barrel and including an image sensor having an image formation region mounted in the housing.

The lenses may include: a forward lens disposed in a forward position from an object side; and a rear lens disposed in a rear position from an image formation side, wherein the non-contact lens disposed between the forward lens and the rear lens.

The forward lens may include a first protrusion portion protruding from a rib of the forward lens toward the rear lens, and the non-contact lens is accommodated within the first protrusion portion.

The rear lens may have a second protrusion portion protruding from a rib of the rear lens toward the forward lens, and the first protrusion portion is accommodated within the second protrusion portion.

Other features and aspects will be apparent from the following detailed description, the drawings, and the claims.

BRIEF DESCRIPTION OF DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
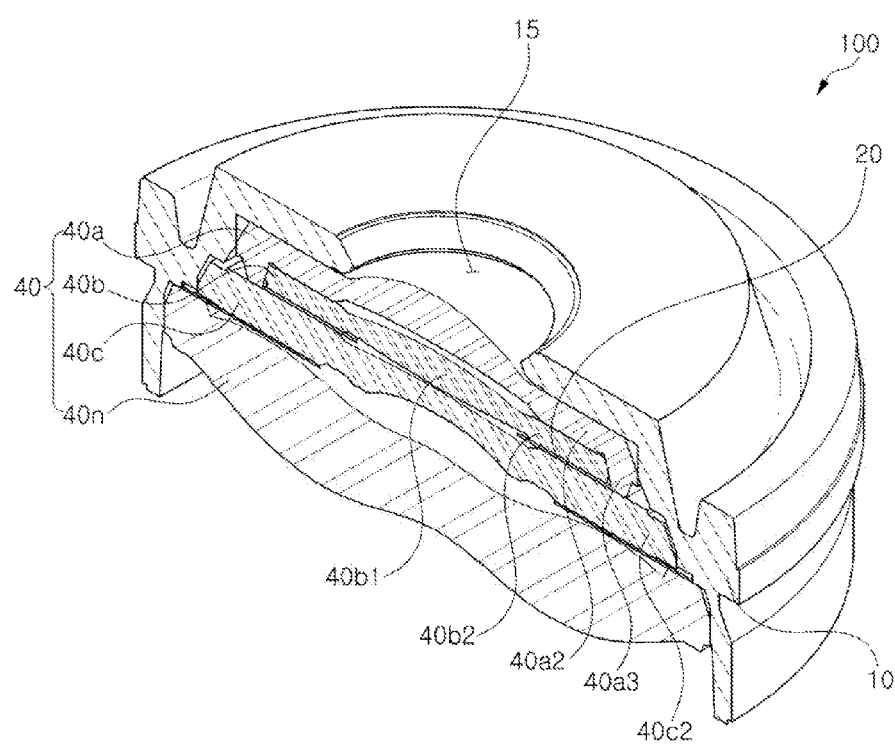
FIG. 1 is a cutaway perspective view schematically illustrating a lens assembly, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, regarding directions, an optical axis direction, such as, a Z direction, refers to a vertical direction with reference to a lens barrel as depicted in the drawings, and a horizontal direction, such as, an X-Y direction, refers to a direction perpendicular to the optical axis direction or Z direction as depicted in the drawings.

Also, an inner diameter direction refers to a direction toward a center of a circle, and an outer diameter direction refers to a direction away from the center of a circle.

Figure 2:
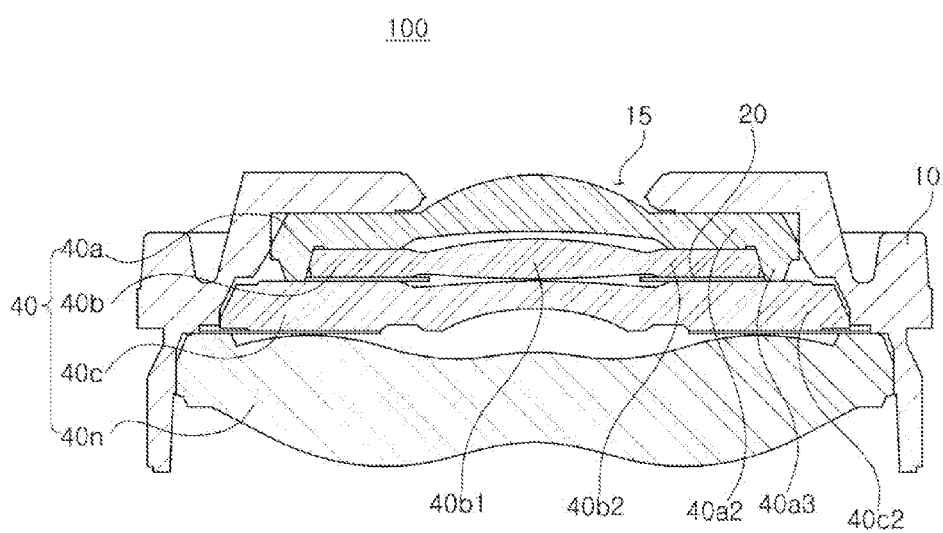
FIG. 2 is a cross-sectional view of the lens assembly of FIG. 1.

FIG. 1 is a cutaway perspective view schematically illustrating a lens assembly, according to an embodiment, and FIG. 2 is a cross-sectional view of the lens assembly of FIG. 1.

Referring to FIGS. 1 and 2, a lens assembly 100, according to an embodiment, includes a lens barrel 10 accommodating at least one lens 40, and at least one or more light blocking members 20.

The lens barrel 10 includes a hollow cylindrical shape to accommodate the lens 40 therein and an incident hole 15 allowing ambient light to be incident onto the lens 40 therethrough.

One or more lenses 40 are accommodated within the lens barrel 10. When the plurality of lenses 40 are provided, the plurality of lenses 40 are aligned to center along an optical axis within the lens barrel 10.

The lenses 40 disposed within the lens barrel 10 are arranged along an optical axis and number of lenses 40 is based on a design and purpose of the lens assembly 100, and each of the lenses 40 may have the same or different refractive indices. Also, each of the lenses 40 may have the same or different refractive powers. The number of lenses 40 may vary from one lens to six lenses.

The light blocking member 20 blocks light passing through ribs 40a2, 40b2, and 40c2 of the lenses 40 in light passing through the lenses 40.

Also, at least one of the light blocking members 20 is an iris adjusting an amount of light passing through a light-transmissive portion, for example, 40b1. The light blocking members 20 are disposed between the ribs 40a2, 40b2, and 40c2 of the lenses 40, but is not limited thereto. Other portions of the lenses 40 may be blocked from transmitting light by the light blocking members 20. Further, the at least one of the light blocking members 20 may be placed at other portions of the lenses 40 to adjust the amount of light passing through other light-transmissive portions.

The lenses 40 include a forward lens 40a, disposed to be closest to the incident hole 15 of the lens barrel 10, and an image side lens 40n, disposed to be closest to an opening opposing the incident hole 15. Thus, the image side lens 40n is defined as a lens disposed to be most adjacent to an image sensor (60 of FIG. 4).

Also, one or more lenses 40b and 40c are disposed between the forward lens 40a and the image side lens 40n.

Each of the lenses 40 is divided into the light-transmissive portion, such as, 40b1, through which light is transmitted and ribs, such as, 40a2, 40b2, and 40c2, extending from the vicinity of the light-transmissive portion so as to be in contact with the lens barrel. The light-transmissive portion 40b1 is formed such that at least one surface thereof is curved, and the ribs 40a2, 40b2, and 40c2 are disposed outside of the light-transmissive portion and formed to be flat, without curvature.

In addition, at least one non-contact lens 40b of the lenses 40, according to an embodiment is disposed to be spaced apart from an inner circumferential surface of the lens barrel 10 so as be in a state of non-contact with the lens barrel 10.

The non-contact lens 40b includes a light-transmissive portion 40b1 and a rib 40b2, like the other lenses 40, and the rib 40b2 has a width smaller than those of other lenses 40. Outer circumferential surfaces of the non-contact lens 40b faces inner circumferential surfaces of the forward lens 40a. As shown in FIG. 1, in one example, the forward lens 40a extends from one end (40b2) of the non-contact lens 40b to another end (40b2) of the non-contact lens 40b and the forward lens 40a extends in a downward direction perpendicular to the optical axis, facing the outer circumferential surfaces of the non-contact lens 40b. In one embodiment, at least one of the inner circumferential surfaces of the forward lens 40a is in direct contact with at least one of the outer circumferential surfaces of the non-contact lens 40b. In another embodiment, at least one of the inner circumferential surfaces of the forward lens 40a is spaced apart from at least one of the outer circumferential surfaces of the non-contact lens 40b. In a further embodiment, at least one of the inner circumferential surfaces of the forward lens 40a faces at least one of the outer circumferential surfaces of the non-contact lens 40b, including a light blocking member 20. Thus, in one example, an outer circumferential surface of the rib 40b2 is in a state of non-contact with an inner circumferential surface of the lens barrel 10.

The forward lens 40a and a rear lens 40c, respectively, are disposed on opposite surfaces of a forward non-contact lens 40b. Thus, the lens assembly 100, according to an embodiment, includes at least three lenses 40, and among then, the forward non-contact lens 40b is disposed in a middle portion of the lens assembly 100.

Hereinafter, for the purposes of description, among the three lens elements, a lens disposed forward, in an object side direction, will be referred to as a forward non-contact lens 40*b*, a lens disposed to the rear, in an image side direction, will be referred to as a rear lens 40*c*.

Thus, the lenses 40, according to an embodiment, are defined as a first lens 40*a* (a forward lens), a second lens 40*b* (a non-contact lens), a third lens 40*c* (a rear lens), and a fourth lens 40*n* (an image side lens) sequentially from an object side towards an image side.

In corresponding to a shape of the non-contact lens 40*b* formed thusly, the lenses 40*a* and 40*c* disposed on or facing opposite surfaces of the non-contact lens 40*b* have at least one protrusion portion 40*a*3. In an embodiment, the protrusion portion 40*a*3 is provided in the forward lens 40*a*.

The protrusion portion 40*a*3 protrudes outwardly from the rib 40*a*2 of the forward lens 40*a*, and protrudes, in one example, to be in contact with a surface of the non-contact lens 40*b*.

Also, the protrusion portion 40*a*3 has an inner diameter having a size corresponding to an outer diameter of the non-contact lens 40*b*. In detail, an inner surface of the protrusion portion 40*a*3 is in contact with an outer circumferential surface of the rib 40*b*2 of the non-contact lens 40*b*. Thus, the inner diameter of the protrusion portion 40*a*3 is equal to the outer diameter of the non-contact lens 40*b* or is greater within tolerance.

The non-contact lens 40*b* is formed to have a circular shape overall. Thus, the protrusion portion 40*a*3 protrudes in a circular ring shape. Also, the non-contact lens 40*b* is disposed within an inner space formed by the circular protrusion portion 40*a*3.

Because the non-contact lens 40*b* is disposed within the internal space formed between the rib 40*b*2 and the protrusion portion 40*a*3, the rib 40*b*2 of the non-contact lens 40*b* is in surface-contact with the rib 40*a*2 of the forward lens 40*a*. However, in an alternative embodiment, a light blocking member is interposed between the rib 40*a*2 of the non-contact lens 40*b* and the rib 40*a*2 of the forward lens 40*a*2.

Also, the protrusion portion 40*a*3 includes a cross-sectional area decreasing toward an end thereof, and thus, an inner surface of the protrusion portion 40*a*3 has a sloped surface.

In order to correspond thereto, an outer circumferential surface of the rib 40*b*2 of the non-contact lens 40*b* has a sloped surface corresponding to the sloped surface of the protrusion portion 40*a*3.

In addition, the protrusion portion 40*a*3, according to an embodiment, protrudes to be longer than a thickness of the rib 40*b*2 of the non-contact lens 40*b*. Thus, an end of the protrusion portion 40*a*3 is in contact with the rib 40*c*2 of the third lens 40*c*, disposed on the opposite side of the non-contact lens 40*b*, and secures a space from the third lens 40*c*, the rear lens.

In one example, a light blocking member or a spacer is interposed between the rib 40*b*2 of the non-contact lens 40*b* and the rib 40*c*2 of the rear lens 40*c*. When the light blocking member 20 is interposed, the light blocking member 20 is bonded to the rib 40*b*2 of the non-contact lens 40*b* or the rib 40*c*2 of the rear lens 40*c*.

However, in an alternative configuration, the light blocking member 20 is bonded to the rib 40*b*2 of the non-contact lens 40*b* and the rib 40*c*2 of the rear lens 40*c*. In this case, because the light blocking member 20 is firmly and tightly attached to the non-contact lens 40*b*, a movement of the non-contact lens 40*b* is suppressed and controlled.

The lens assembly 100, according to an embodiment configured as described above may have a structure appropriate for a thin lens assembly.

Because the lens assembly 100 is manufactured to be thin, thicknesses of the lenses 40 are reduced, and thus, the ribs are also formed to be very thin. However, if the ribs are excessively reduced in thickness (for example, to be equal to or less than 0.2 mm), it is very difficult to handle the lenses 40 during a manufacturing process, degrading formability, which may also lead to a degradation of productivity.

Thus, in the lens assembly 100, according to an embodiment, a size of the rib 40*b*2 with respect to the lens, such as the non-contact lens 40*b* or the second lens, having the thin rib is minimized. Thus, the non-contact lens 40*b* is formed to have an outer diameter smaller than an inner diameter of the lens barrel 10, and thus, it is in a state of non-contact with the lens barrel 10.

Also, because the size of the rib 40*b*2 is minimized, the corresponding lens, such as the non-contact lens 40*b* or the second lens, is insertedly disposed within an accommodation space formed by the protrusion portion 40*a*3 of other lens, such as the forward lens 40*a* or the first lens, is disposed to be adjacent thereto.

Thus, the non-contact lens 40*b* is automatically aligned on the basis of the forward lens 40*a*. For instance, a central axis or optical axis alignment of the non-contact lens 40*b* is determined by the protrusion portion 40*a*3 of the forward lens 40*a*, rather than being determined by the lens barrel 10.

In general, a tolerance range of a lens is smaller than a tolerance range of a lens barrel. Thus, when a further lens is aligned on the basis of one lens, the further lens is more precisely aligned.

The non-contact lens 40*b*, according to an embodiment, is coupled to the forward lens 40*a* on the basis of the protrusion portion 40*a*3 formed in the forward lens 40*a*, alignment is precisely done compared with a conventional lens assembly in which a central axis is aligned using the lens barrel 10. Thus, a decentering problem in which optical axes of lenses deviated from each other may be minimized.

The configurations are not limited to the embodiments described above and various modifications may be implemented.

Figure 3:
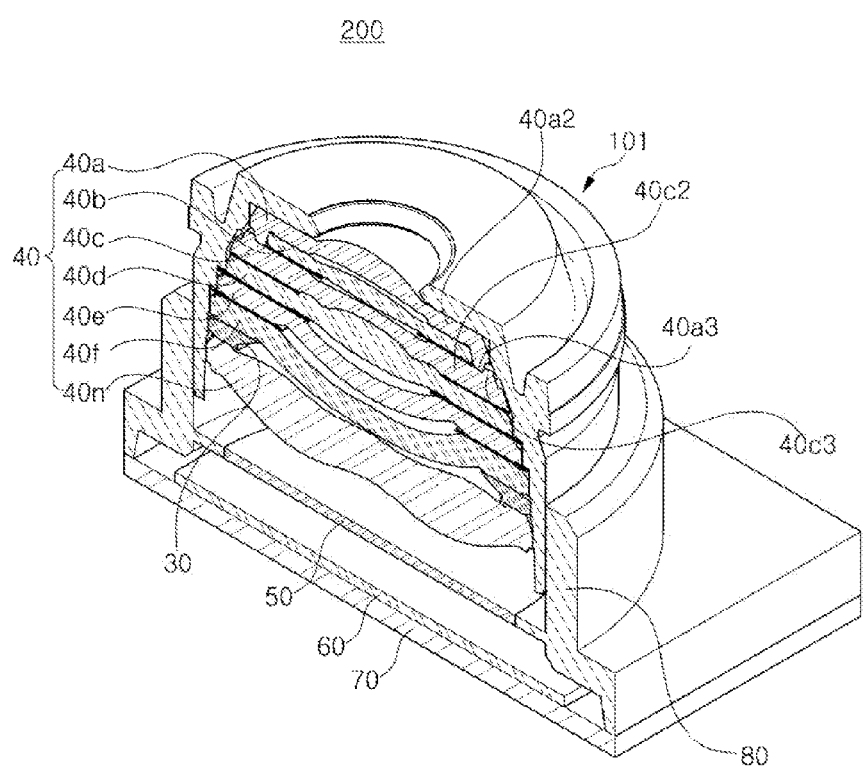
FIG. 3 is a cutaway perspective view schematically illustrating a camera module including a lens assembly, according to an embodiment.
Figure 4:
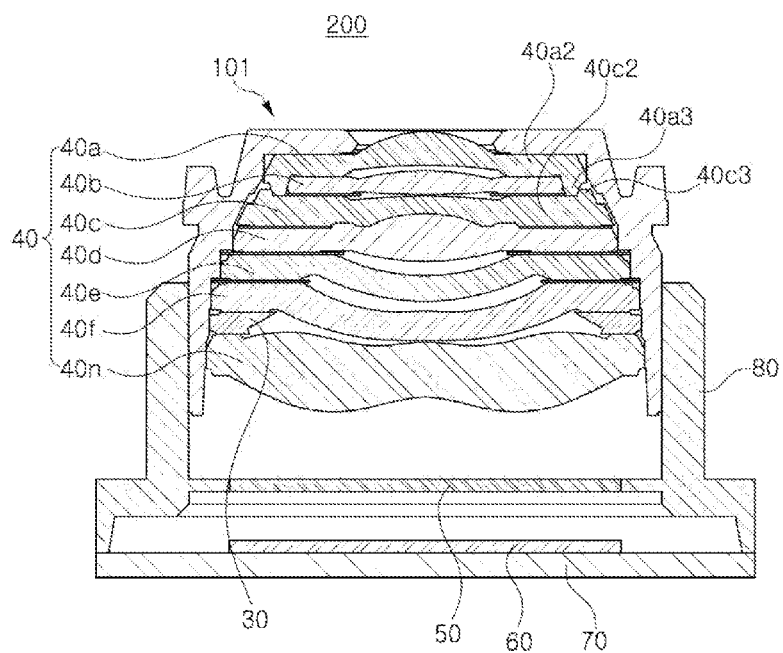
FIG. 4 is a cross-sectional view of the camera module of FIG. 3.

FIG. 3 is a cutaway perspective view schematically illustrating a camera module including a lens assembly, according to another embodiment, and FIG. 4 is a cross-sectional view of the camera module of FIG. 3.

Referring to FIGS. 3 and 4, a camera module 200, according to an embodiment includes an optical filter 50, an image sensor 60, a substrate 70, a housing 80, and a lens assembly 101.

The optical filter 50 refers to an infrared (IR) cut-off filter or a cover glass provided between the image sensor 60 and the lens 40.

The optical filter 50 serves to block infrared light and allow visible light to be transmitted therethrough, and prevents a noise phenomenon from occurring in a digital image.

The optical filter 50 is integrally provided in an image formation region corresponding to an image region of the image sensor 60, and has a quadrangular shape corresponding to a shape of the housing 80.

The image sensor 60 is a structural element having an image formation region on an upper surface thereof in order to form an image with light incident through the lens 40. The image sensor 60 converts the incident light into an electrical signal. For example, the image sensor 60 is configured as a charge-coupled device (CCD) or a complementary metal-oxide semiconductor (CMOS).

Also, the image sensor 60 is electrically connected to the substrate 70 as a structural unit to transmit an image signal.

Various structural elements, including the image sensor 60, are mounted on the substrate 70. As the substrate 70, according to an embodiment, a flexible printed circuit board (FPCB) with a pattern circuit printed thereof is used, but the substrate 70, according to an embodiment, is not limited thereto.

The housing 80 provides an appearance of the camera module, and accommodates the lens barrel 10 therein. Also, the substrate 70, on which the image sensor 60 with an image formation region is mounted, is coupled to one end of the housing 80.

In the lens assembly 101, according to an embodiment, is configured to be similar to that of the previous embodiment, and is different in the configuration of the third lens. Thus, descriptions of the same components as those of various embodiments described above will be omitted, and only the third lens will be mainly described.

The lens assembly 101, according to an embodiment, includes lenses 40a to 40n, and the protrusion portion 40c3 (hereinafter, referred to as a second protrusion) is also formed in the rear lens 40c and in the forward lens 40a. The second protrusion portion 40c3 is engagingly coupled the protrusion portion 40a3 (hereinafter, referred to as a first protrusion portion) of the forward lens 40a.

The second protrusion portion 40c3 is disposed outside of the first protrusion portion 40a3. Thus, the first protrusion portion 40a3 is insertedly coupled within the second protrusion portion 40c3.

Also, an outer circumferential surface of the first protrusion portion 40a3 and an inner circumferential surface of the second protrusion portion 40c3 is coupled to be in surface-contact with each other. Thus, an outer diameter of the first protrusion portion 40a3 is equal to an inner diameter of the second protrusion portion 40c3, or is smaller than the inner diameter of the second protrusion portion within tolerance.

Also, the second protrusion portion 40c3 has a cross-sectional area decreasing toward an end thereof. Thus, an inner surface or an outer surface of the second protrusion portion 40c3 is formed as a sloped surface.

An inner surface of the second protrusion portion 40c3, according to an embodiment, is formed as a sloped surface corresponding to the shape of the first protrusion portion 40a3. However, the shape of the second protrusion portion 40c3 is not limited thereto and may be variously modified.

Because the second protrusion portion 40c3 is formed in the rear lens 40c, the rear lens 40c is automatically aligned with respect to the forward lens 40a. For instance, alignment of a central axis or an optical axis of the rear lens 40c is determined by the protrusion portions 40a3 and 40c3 of the forward lens 40a and the rear lens 40c, rather than being determined by the lens barrel 10. Thus, alignment is precisely performed.

Furthermore, at least one spacer is provided within the lens barrel, according to an embodiment. At least one spacer 30 is provided between the lenses 40 such that the stacked lenses 40 are spaced apart from one another by a predetermined distance. In one example, the distance between the lenses 40 is set to be different according to optical characteristics.

In order to allow image light transmitting through the light-transmissive portion of the lenses 40 to pass therethrough easily, the spacer 30 has a hole formed in a central portion and slightly greater than the light-transmissive portion. Also, the spacer is formed to be similar to the lenses 40 in size and shape. Thus, when the lenses 40 have a circular shape, the spacer 30 also has a circular shape. For example, the spacer 30 may have a doughnut-like shape.

For example, in various embodiments described above, the lens assembly including a single non-contact lens is taken as an example, but the embodiments are not limited thereto and a plurality of lenses may be configured as non-contact lenses.

Also, various modifications may be implemented such that the protrusion portion is configured to protrude as a plurality of projections or protrude in a convex shape, rather than a continuously annular shape.

Also, in the various embodiments described above, a case in which the forward lens is configured as the first lens disposed to be closest to an object side is taken as an example. However, the configuration of an embodiment is not limited thereto and may be modified according to the number or structure of the lenses. For example, a kth lens (k is an integer number) from an object side towards an image side is configured as a forward lens and a (k+1)th lens is configured as a non-contact lens.

As set forth above, in the lens assembly, according to various embodiments, because the non-contact lens is coupled to the first lens on the basis of the protrusion portion formed in the forward lens, alignment is precisely performed, compared with conventional lens assemblies in which a central axis is aligned using the lens barrel. Thus, a decentering problem in which optical axes of the lenses deviate from each other is minimized.

Also, because a size of the rib of the lens is minimized, even though the lens is formed to be thin, the lens may be easily manufactured, and thus, increasing productivity.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly, comprising:
   lenses, wherein the lenses comprise
      a forward lens disposed in a forward position from an object side, wherein the forward lens comprises a first protrusion portion protruding from a rib of the forward lens toward the rear lens,
      a rear lens disposed in a rear position from an image formation side, wherein an end of the first protrusion portion is in contact with a rib of the rear lens, and
      a non-contact lens disposed between the forward lens and the rear lens; and
   a lens barrel configured to accommodate the lenses,
   wherein the non-contact lens is coupled to the lens barrel, and in non-contact with the lens barrel.

2. The lens assembly of claim 1, wherein the non-contact lens is accommodated in an internal space formed between the rib of the forward lens and the first protrusion portion.

3. The lens assembly of claim 2, wherein a light blocking member is interposed between a rib of the non-contact lens and the rib of the forward lens.

4. The lens assembly of claim 1, wherein the first protrusion portion protrudes to have an annular shape along the rib of the forward lens.

5. The lens assembly of claim 1, wherein the non-contact lens is coupled to the forward lens such that an outer circumferential surface of the non-contact lens is in contact with an inner circumferential surface of the first protrusion portion.

6. The lens assembly of claim 1, wherein the first protrusion portion is formed to have a cross-sectional area decreasing toward an end of the first protrusion portion.

7. The lens assembly of claim 6, wherein the first protrusion portion has an inner circumferential surface formed as a sloped surface.

8. The lens assembly of claim 1, wherein an inner diameter of the first protrusion portion is equal to an outer diameter of the non-contact lens or is greater within tolerance.

9. The lens assembly of claim 1, wherein at least one of inner circumferential surface of the forward lens faces at least one outer circumferential surface of the non-contact lens, comprising a light blocking member.

10. The lens assembly of claim 1, wherein the rear lens has a second protrusion portion protruding from a rib of the rear lens toward the forward lens.

11. A lens assembly, comprising:
lenses, wherein the lenses comprise
   a forward lens disposed in a forward position from an object side,
   a rear lens disposed in a rear position from an image formation side, and
   a non-contact lens, wherein the non-contact lens is disposed between the forward lens and the rear lens,
   wherein the forward lens comprises a first protrusion portion protruding from a rib of the forward lens toward the rear lens, and
   wherein the rear lens has a second protrusion portion protruding from a rib of the rear lens toward the forward lens, and wherein the second protrusion portion is engagingly coupled to the first protrusion portion; and
a lens barrel configured to accommodate the lenses, wherein the non-contact lens is coupled to the lens barrel, and is in non-contact with the lens barrel.

12. A lens assembly, comprising:
lenses, wherein the lenses comprise
   a forward lens disposed in a forward position from an object side,
   a rear lens disposed in a rear position from an image formation side, and
   a non-contact lens, wherein the non-contact lens is disposed between the forward lens and the rear lens,
   wherein the forward lens comprises a first protrusion portion protruding from a rib of the forward lens toward the rear lens, and
   wherein the rear lens has a second protrusion portion protruding from a rib of the rear lens toward the forward lens, and wherein the rear lens is coupled to the forward lens such that the first protrusion portion is accommodated in a space formed within the second protrusion portion; and
a lens barrel configured to accommodate the lenses, wherein the non-contact lens is coupled to the lens barrel, and is in non-contact with the lens barrel.

13. The lens assembly of claim 1, wherein a central axis alignment of the non-contact lens is determined by the first protrusion portion of the forward lens.

14. A camera module, comprising:
a lens assembly comprising a lens barrel configured to accommodate lenses; and
a housing coupled to the lens barrel and comprising an image sensor having an image formation region mounted in the housing;
wherein the lenses comprise:
   a forward lens disposed in a forward position from an object side,
   a rear lens disposed in a rear position from an image formation side, and
   a non-contact lens disposed between the forward lens and the rear lens, coupled to the lens barrel, and in non-contact with the lens barrel,
   wherein the forward lens comprises a first protrusion portion protruding from a rib of the forward lens toward the rear lens, an end of the first protrusion portion is in contact with a rib of the rear lens, and the non-contact lens is accommodated within the first protrusion portion.

15. A camera module, comprising:
a lens assembly comprising a lens barrel configured to accommodate lenses, wherein the lenses comprise:
   a forward lens disposed in a forward position from an object side,
   a rear lens disposed in a rear position from an image formation side, and
   a non-contact lens disposed between the forward lens and the rear lens, coupled to the lens barrel, and in non-contact with the lens barrel,
   wherein the forward lens comprises a first protrusion portion protruding from a rib of the forward lens toward the rear lens, and the non-contact lens is accommodated within the first protrusion portion, and
   wherein the rear lens has a second protrusion portion protruding from a rib of the rear lens toward the forward lens, and the first protrusion portion is accommodated within the second protrusion portion; and
a housing coupled to the lens barrel and comprising an image sensor having an image formation region mounted in the housing.

16. A camera module, comprising:
a lens assembly comprising a lens barrel accommodating lenses, wherein the lenses comprise
   a forward lens,
   a rear lens, and
   a non-contact lens disposed between the forward lens and the rear lens, coupled to the lens barrel, and in non-contact with the lens barrel,
   wherein the forward lens comprises a first protrusion portion protruding from a rib of the forward lens toward the rear lens, the rear lens has a second protrusion portion protruding from a rib of the rear lens toward the forward lens, and the second protrusion portion is engagingly coupled to the first protrusion portion; and
a housing coupled to the lens barrel and comprising an image sensor having an image formation region mounted in the housing.

* * * * *